United States Patent [19]
Shimizu

[11] Patent Number: 5,746,415
[45] Date of Patent: May 5, 1998

[54] WATER SAVING DEVICE FOR USE IN WATER LINES

[76] Inventor: Kiyoshi Shimizu, Asahi Bussan Kabushiki Kaisha 226 Shindenshintamashiro, Hisagoyama-cho, Kuze-gun, Kyoto-fu, Japan

[21] Appl. No.: 675,565

[22] Filed: Jul. 3, 1996

[51] Int. Cl.⁶ .................................... F16K 5/10
[52] U.S. Cl. .................................. 251/208; 251/118
[58] Field of Search ............................ 251/208, 118, 251/127, 206, 205

[56] References Cited

U.S. PATENT DOCUMENTS

| | | | |
|---|---|---|---|
| 2,510,356 | 6/1950 | Werts | 251/206 X |
| 3,480,037 | 11/1969 | Alexander, Jr. | 251/208 X |
| 4,140,297 | 2/1979 | Bussell | 251/208 X |
| 4,360,040 | 11/1982 | Cove et al. | 251/208 X |
| 4,516,606 | 5/1985 | Worley | 251/208 X |

*Primary Examiner*—Kevin Lee
*Attorney, Agent, or Firm*—Kokjer, Kircher, Bowman & Johnson

[57] ABSTRACT

A water saving device comprising a plate member which is sandwiched within and maintained within a joint portion of a tap water line and divides the tap water line across the line of water flow. A main body block is bolted to one side of the plate member along the axis of and positioned in the middle of tap water line. The plate and the main body block each has a plurality of water saving holes arranged circumferentially so that the number of opposing holes in the plate and the main body block which are aligned to allow water flow therethrough can be changed by relative rotation of the plate member with the main body block around bolt 13.

12 Claims, 3 Drawing Sheets

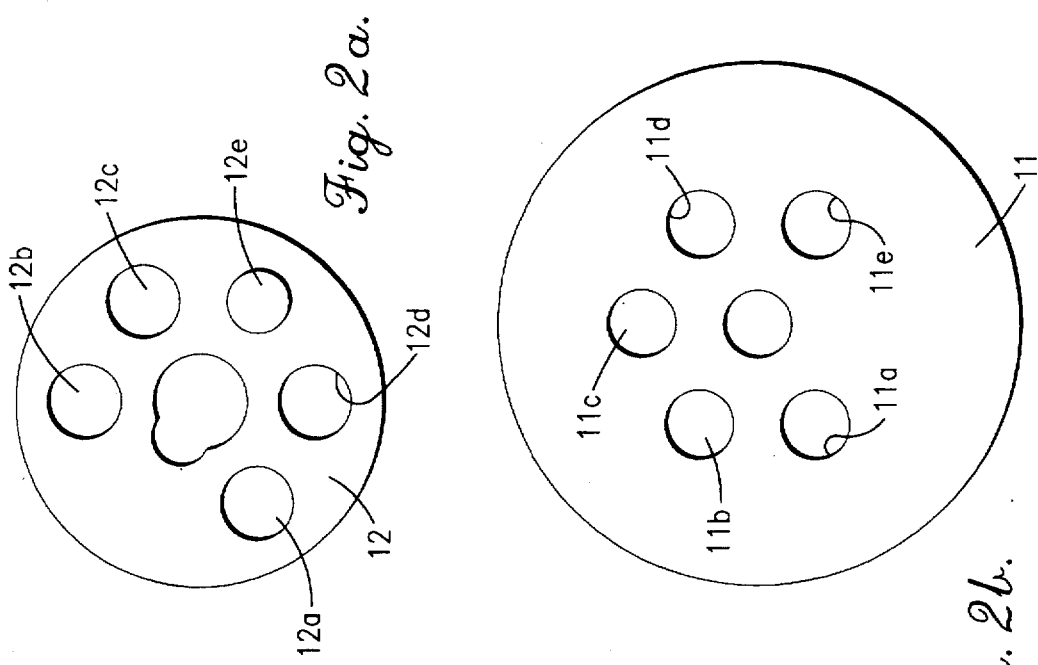
Fig. 2a.
Fig. 2b.
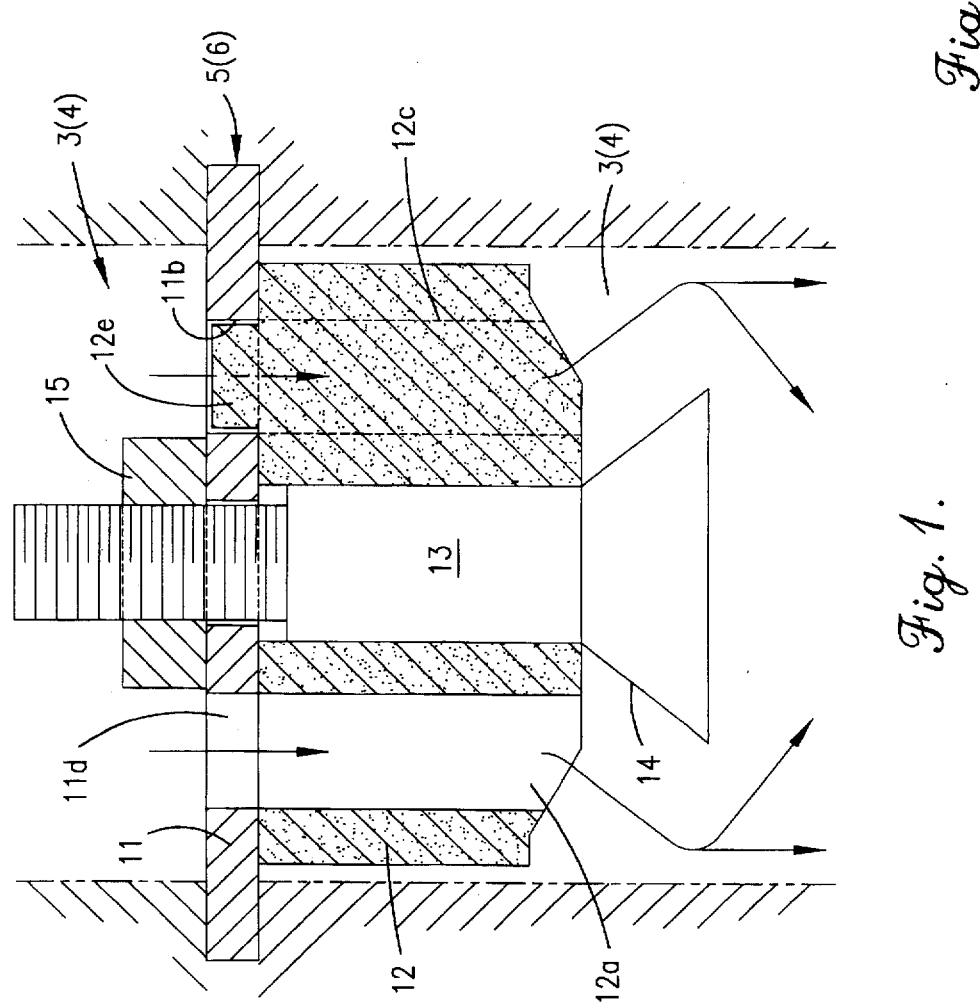
Fig. 1.

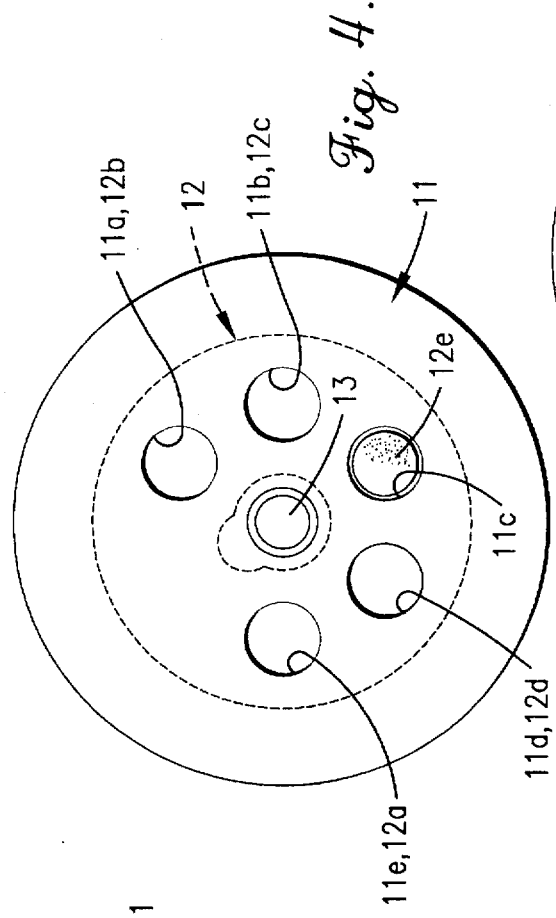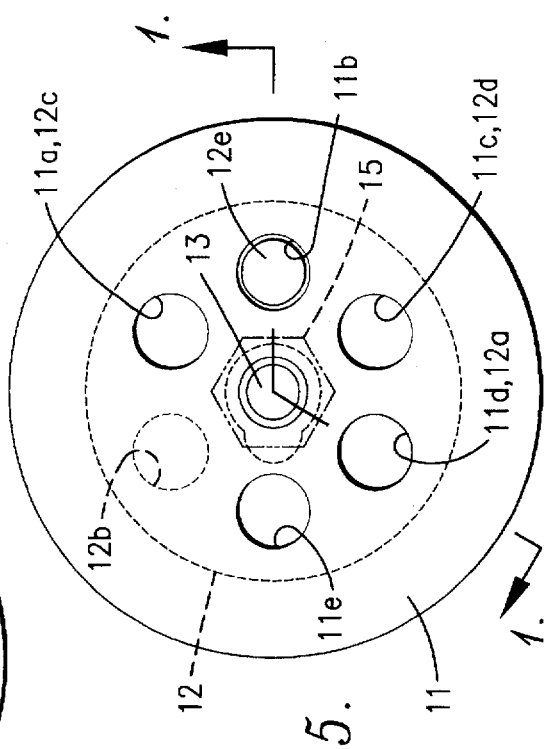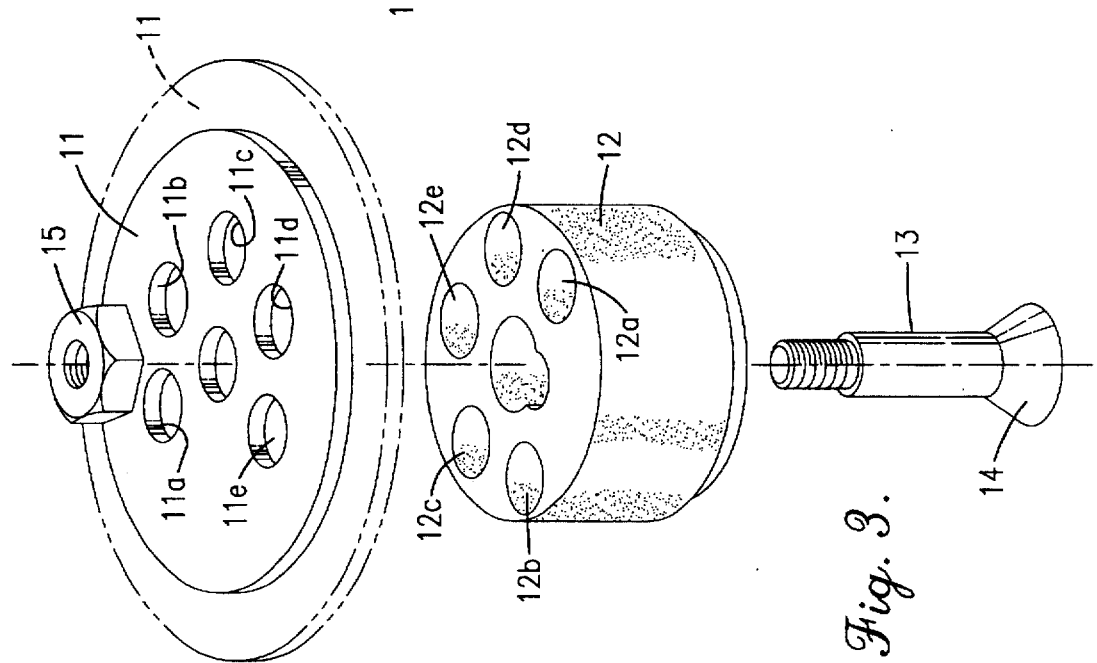

5,746,415

WATER SAVING DEVICE FOR USE IN WATER LINES

BACKGROUND OF THE INVENTION

1. Field of the Invention

The present invention relates generally to water saving devices. More particularly, the present invention relates to water saving devices which save water by being positioned in the middle of a tap water line and limit the amount of water flow through the line.

2. Description of the Related Art

In the past, it has been known to use a water saving device of the type shown in FIG. 8 wherein the device is attached to a joint portion (g) of a tap water line (b). The main body (a) of the device is located in the tap water line (b) and attached to the joint using attachment flange (f) which is a part of the main body. Water flow through tap water line (b) is restricted by flowing through water saving holes (d) provided circumferentially in the main body of the device at a plurality of locations.

By limiting the flow of water in this fashion, the device is able to save water in a unit-time water consumption amount which is a percentage of the total flow in the case of maximum water flow. For example, if the maximum water flow amount is generally 15 l/minute, this can be reduced to 13 l/minute at constant water pressure. Thus, the device results in reducing the wasteful use of water at such locations as the kitchen sink, the washroom, the shower, etc.

In the past, many of these type devices included water saving holes extending through the main body generally parallel to the tap water line. However, the water flow on the downstream side of the tap water line after having passed through the water saving holes tended to taper off due to the water flow limitation, causing the water flow to feel insufficient to the user. In order to solve this problem, it was suggested to slant the water saving holes (d) as shown in FIG. 8 in relation to the axis of the main body so as to slant outward from the upstream to the downstream portion of the main body. In this manner, water passing through water saving holes (d) expands downstream of the main body, flowing along the inside wall surface of tap water line (b), in such a manner as to not make the user feel as if the water flow had been reduced or tapered off.

While the device shown in FIG. 8 is useful, there are some drawbacks associated with this design. In particular, since the flange (f) and main body (a) are formed as a unitary device, a different device must be made for each different size of flange needed. For example a different size of flange is needed to fit different standard tap water lines and/or associated joint portions such as in the case of a swing-arm faucet or shower head, etc. Furthermore, different water saving devices would need to be made for different conditions such as different tap water line water flow settings and water saving percentages. Moreover, the need to make a plurality of water saving holes in a slanted configuration as shown in FIG. 8 makes the manufacture of these devices more difficult and costly. Accordingly, in spite of the fact that the water saving device itself is small, it is relatively expensive.

Although it is desirable from the standpoints of resource conservation, energy conservation, and expense reduction that water saving be promoted, it is also desired that reduction in the cost of water saving devices be addressed at the same time.

Within that context, the present invention has as its object the provision of a water saving device that is less expensive to manufacture, that has multiple water flow settings, that can be used with different types of tap water line and joint standards, and that does not give rise to a different feeling to the user (e.g., reduced pressure or flow) because of the water saving feature when in use.

SUMMARY OF THE INVENTION

The water saving device of the present invention, in order to achieve the above-described object, provides a plate member which is sandwiched within and maintained within the joint portion of a tap water line and which divides the tap water line across the line of water flow. A plurality of holes are circumferentially arranged around the plate. A main body block is bolted or otherwise secured to one side of the plate member along the axis of the tap water line and positioned within the tap water line. The main body block is characterized by having a plurality of water saving holes arranged circumferentially around the bolt member. The water saving holes in the main body block are arranged such that the holes may be aligned with the holes in the plate member to permit water flow through the aligned holes. Preferably, the holes are arranged such that the amount of water flow through the device may be adjusted by aligning a greater or lesser number of the holes in the block with those in the plate.

Water saving in accordance with the present invention can therefore be carried out by sandwiching and maintaining a plate member within the joint portion of a tap water line, positioning the plate member together with the main body block in the tap water line so that it divides the line across the line of flow, thereby limiting the flow of water. Water saving can be carried out with a small number of parts and water saving devices in relation to many different desired water saving percentage settings, and at a reduced cost. Also, by merely exchanging the plate member for one with a different outside diameter, different tap water line and joint portion standards can be accommodated. Therefore, cost is reduced compared to prior devices where different water saving devices are needed each time a single condition changes.

In a preferred embodiment, the main body block is positioned on the downstream side of the plate member and the water saving holes in the main body block are provided parallel to the axis of the main body block and tap water line. An umbrella or conical shaped surface is formed on the end of the bolt such that this surface faces the discharge path of water passing through the water saving holes in the main body block. The number of water saving holes circumferentially arranged in the plate member and the main body block which align to pass water in the tap water line may be changed by relative rotation of the plate member to the main body around the bolt member. The plate member therefore functions as a shutter member, achieving, per the setting, differences in water saving percentages in accordance with differences in hole diameter and number of holes aligned. Therefore, a plurality of different water saving percentages, set in accordance with necessity, can be handled with one water saving device.

Since the holes are parallel to the length of the main body block and easy to make, reduced costs can be expected. Moreover, even though the water saving holes are parallel to their own axes, the water flow discharged after passing through same strikes the umbrella-shaped surface formed on the part of the bolt which protrudes from the main body block and is deflected outwardly to flow along the inner surface of the tap water line as well. Therefore, it is possible to prevent the tapering off of the water flow because of the water saving and to make it so that there is no difference in feeling to the user. Since special parts and assemblies are not required for this purpose, cost reduction can be expected.

The plate member is preferably made of metal and the main body block be a molded product. If the plate member is made of metal and the body block is a molded product, the plate member can be easily obtained by press processing the appropriate metal plate. As to the main body block, this block should be made with sufficient volume to contain water saving holes of sufficient length to be effective in limiting the water flow amount. Such a body can be easily obtained by molding which also results in cost reduction. The main body block is preferably formed of ceramics, a material which is harmless to health and which has a long life and can be easily obtained.

BRIEF DESCRIPTION OF THE DRAWINGS

FIG. 1 is a side cross-sectional view showing a water saving device in a water tap line in accordance with a preferred embodiment of the present invention;

FIG. 2 is a top plan view of the plate member (a) and main body block (b) of the water saving device of FIG. 1;

FIG. 3 is an exploded perspective view of a disassembled water saving device of FIG. 1;

FIG. 4 is a top plan view of the water saving device of FIG. 1 showing four of the water saving holes in the open position;

FIG. 5 is a top plan view of the water saving device of FIG. 1 showing three of the water saving holes in the open position;

DETAILED DESCRIPTION OF THE INVENTION

Figure 6:
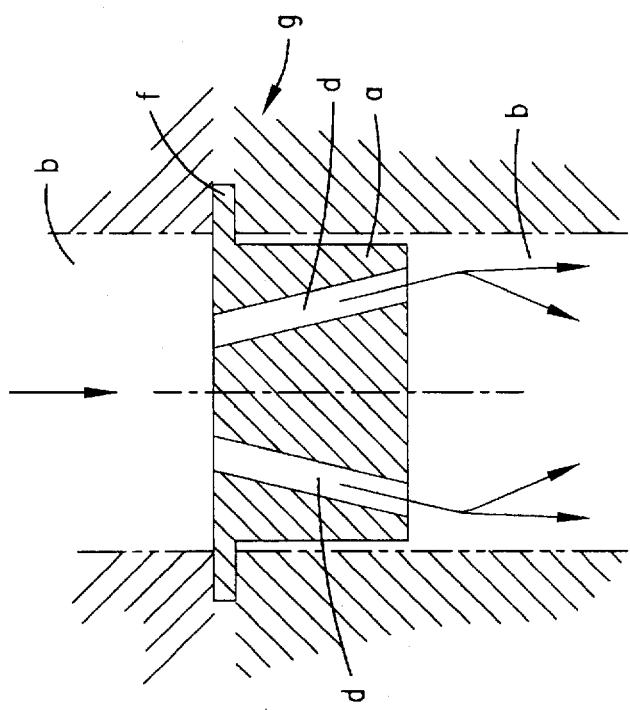
FIG. 6 is a side fragmented view showing the water saving device of FIG. 1 being used in a swing-arm faucet.
Figure 7:
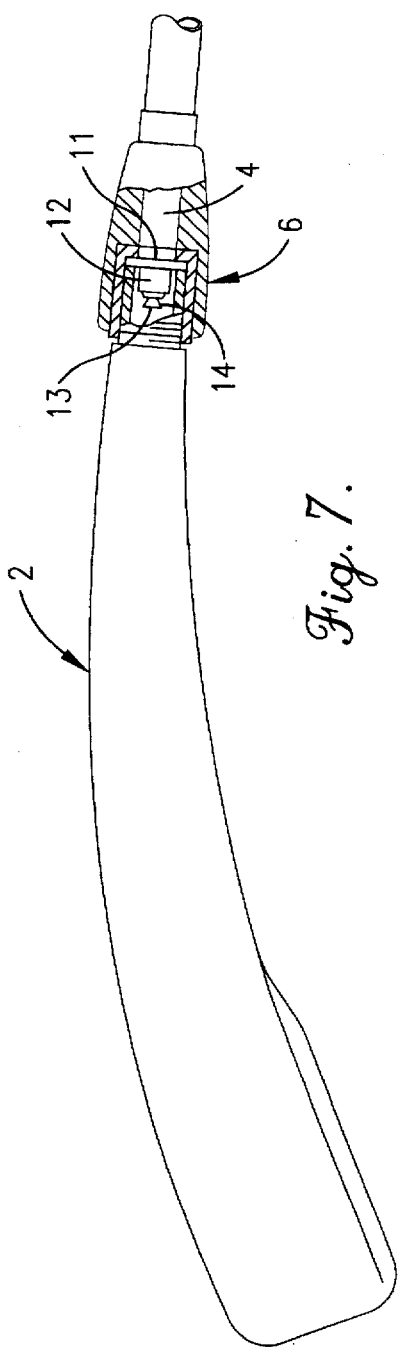
FIG. 7 is a fragmented side view showing the water saving device of FIG. 1 being used in a shower head.
Figure 8:
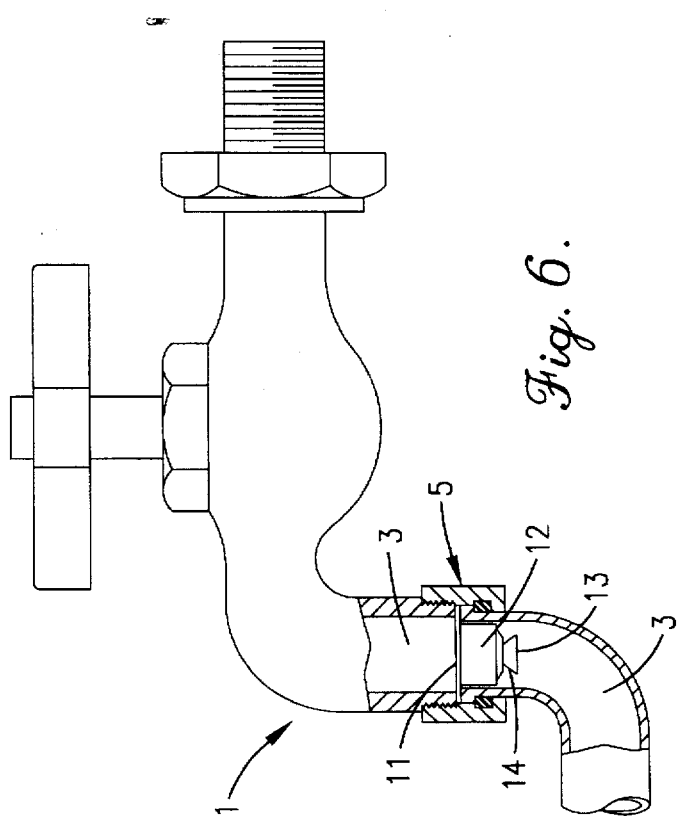
FIG. 8 is a cross-sectional view showing a water saving device of the prior art.

FIGS. 1–5 show the water saving device of a preferred embodiment of the present invention. By way of explanation, this water saving device provides a plate member 11 which is sandwiched within and maintained within joint 5(6) of tap water line 3(4) such as would be used in conjunction with the swing-arm faucet 1 of FIG. 6 or the shower head 2 of FIG. 7. The plate member 11 divides tap water line 3(4) across the direction of water flow. A main body block 12 bolted to one side of plate member 11 along its own axis and that of tap water line 3(4) is positioned within tap water line 3(4).

As shown in FIGS. 2 and 3, the plate member 11 and main body member 12 have five circumferentially arranged water saving holes 11a–11e and four circumferentially arranged water saving holes 12a–12d, respectively. These holes can be aligned to permit water flow through the device and the number of aligned holes may be changed with relative rotation of the plate member 11 with main body block 12 around bolt 13.

FIG. 4 shows the device with four water saving holes 11a, 11b, 11d and 11e of the plate member 11 and the four water saving holes 12a, 12b, 12c and 12d of the main body block in alignment. FIG. 5 shows the device with the three water saving holes 12c, 12d and 12a of the main body member 12 in alignment with holes in the plate member. Accordingly, the water saving percentage of the water saving device when adjusted as shown in FIG. 5 is greater than that of the water saving device when adjusted as shown in FIG. 4. In order to assure that these water saving adjustment positions do not inadvertently change, a position fixing projection 12e is formed on the top surface of main body block 12 which engages one of the water saving holes 11a–11e in plate member 11, as shown in FIG. 4 and FIG. 5, to hold the same in position.

Main body block 12 in the preferred embodiment is positioned on the downstream side of plate member 11. Water saving holes 12a–12d on main body block 12 are provided around and parallel to the axis of main body block 12 and tap water line 3(4). An umbrella-shaped surface facing the discharge path of the water which has passed through water saving holes 12a–12d of main body block 12 is formed on the part of bolt 13 which protrudes from the end of the block.

Bolt 13 in the preferred embodiment penetrates main body block 12 and plate member 11 from the downstream end of main body block 12 and screws into nut 15 on the upstream side of plate member 11 to bolt together plate member 11 and main body block 12. The conically or dish-shaped head of bolt 13 forms an umbrella-shaped surface 14. However, bolt 13 is not limited to this configuration, but can be specially formed. Also, bolt 13 can pass from either plate member 11 or main body block 12 to the other and bolt directly into the side of the other. When done in this way, nut 15 can be eliminated.

In accordance with the present working example, the number of water saving holes 11a–e and 12a–d circumferentially arranged in plate member 11 and main body block 12 which align and pass water in tap water line 3(4) can be changed by relatively rotating plate member 11 and main body block 12 around mutual nut 13 as shown in FIGS. 4 and 5.

In the preferred embodiment, water saving is therefore carried out by sandwiching and maintaining plate member 11 within joint portion 5(6) of tap water line 3(4). The plate is positioned together with main body block 12, in tap water line 3(4) to divide tap water line 3(4) across the direction of flow, and thereby limit the flow of water. This water saving can be handled by a single water saving device with multiple water saving percentage settings which can be set in response to necessity. Depending on the combination of number of holes, the number of variations in the number of holes brought into alignment by the relative rotation of plate member 11, acting as a shutter member, and main body block 12 can be further increased by merely exchanging plate member 11 for a plate member having a different number of holes. In this fashion, even more variations in setting water saving percentages can be handled with little expense. Therefore, several different water saving percentage settings can be handled with only a few parts and water saving devices, and costs are reduced. Also by merely exchanging plate member 11 for a plate member having a different outside diameter, tap water lines 3(4) and joint portions 5(6) having different standards can be handled. Therefore, compared to the case where completely different water saving devices are used, costs are reduced.

Since the main body block 12 is positioned on the downstream side of plate member 11; and water saving holes 12a–12d in main body block 12 are provided around and parallel to the axes of main body block 12 and tap water line 3(4); and since the part of bolt 13 which protrudes from the end of the block has an umbrella-shaped surface 14 formed by the conical-shaped head portion of bolt 13 facing the discharge path of the water which has passed through water saving holes 12a14 12d in main body block 12, main body block 12 moves in conjunction with plate member 11 and different water saving percentages in accordance with different hole diameters and numbers of holes can be achieved. Because water saving holes 12a–12d are parallel to the axes of main body block 12 and tap water line 3(4), formation is easy and cost reduction can be expected in this area as well. Moreover, even though water saving holes 12a–12d are parallel to the axes of main body block 12 and tap water lines 3(4), the water flow which passes through these water saving holes is discharged to strike umbrella-shaped surface 14 of bolt 13 and is deflected outwardly and, as indicated by the arrow in FIG. 1, flows along the inside surface of tap water lines 3(4). Therefore, it is possible to prevent the tapering off of water flow, and, because special parts and assemblies are not necessary to achieve this effect, a reduction in costs can be expected.

Plate member 11 is preferably made of metal, most preferably stainless steel. Main body block 12 is preferably a molded product, most preferably ceramics. If plate member 11 is made of metal, the plate member 11 can be easily obtained by press processing the appropriate metal plate. As to a main body block 12, the block should have sufficient volume to contain water saving holes 12a–12d of sufficient length to be effective in limiting the water flow amount. Such a block can be easily obtained by molding, thereby leading to cost reduction. If main body block 12 is made of ceramics, a block which is not harmful to health and which has a long life can easily be obtained.

In accordance with the water saving device of the present invention, the number of water saving holes in the plate member and in the main body block which come into alignment and pass water in the tap water line changes in accordance with relative rotation of the plate member and the main body block around the bolt member. Therefore, a single water saving device, positioned in a tap water line, can handle a plurality of water saving percentages, set in response to necessity, in carrying out water saving by limiting water flow by use of water saving holes. Therefore, different water saving percentage settings can be handled with just a few parts and water saving devices, and costs are reduced. Also, by merely exchanging the plate member for one with a different outside diameter, tap water lines and joint portions having different standards can be handled. Therefore, costs are reduced compared to the case where a different water saving device is used every time a single condition changes.

In accordance with the preferred embodiment whereby the main body member is positioned on the downstream side of the plate member, water saving holes in the main body member are provided parallel to the axis of the tap water line, and an umbrella-shaped surface facing the discharge path of water which has passed through the water saving holes in the main body block is formed on the part of the bolt which protrudes from the end of the block. The water saving holes for achieving different water saving percentages by moving the main body block in conjunction with the plate member which acts as a shutter member, are parallel to their own axes and their formation is easy. Because of this, cost reduction can be expected. Moreover, the water flow which is discharged after passing through the water saving holes can be made to strike the umbrella-shaped surface of the bolt, deflect outwardly, and flow along the inner surface of the tap water line. Thus, tapering off of the water flow because of the water saving can be prevented and the feeling of using the water remains unchanged. Because of this, special parts and assemblies are not needed, and cost reduction can be expected.

I claim:

1. A water saving device for use within a water line, said device comprising:

a plate member sandwiched and maintained within a joint of a water line so as to divide the water line across the line of water flow, said plate member being exchangeable with other plate members of varying diameter so as to fit within varying sizes of water lines; and a main body block rotatably secured to one side of the plate member and positioned downstream of the plate member within the water line, the plate member and the body block each having a plurality of holes arranged circumferentially so that the number of holes of the body block and plate that are aligned to permit water flow therethrough may be changed by relative rotation of the plate member with the main body block.

2. A water saving device as in claim 1 including disengagable cooperating means on said plate and said main body block for preventing relative rotation therebetween and yet permitting change to a different rotational relationship when disassembled, thus to permit change in the hole alignments.

3. A water saving device in accordance with claim 1, wherein the holes in the main body block are provided parallel the water line.

4. A water saving device in accordance with claim 3, wherein said device additionally comprises a water deflecting member positioned downstream of said main body block, said deflecting member having an umbrella-shaped surface facing a discharge path of water passing through the holes in the main body block.

5. A water saving device in accordance with claim 4, wherein said water deflecting member comprises a bolt used to secure the main body block to said plate, wherein the bolt protrudes from the end of the main body block to form said umbrella-shaped surface.

6. The water saving device in accordance with claim 1, wherein the plate member is made of metal and the main body block is a molded non-metallic product.

7. The water saving device in accordance with claim 6, wherein the main body block is made of ceramics.

8. A water saving device for use in a water line, said device comprising:

a plate member sandwiched and maintained within a joint of a water line so as to divide the water line across the line of water flow;

a main body block secured to one side of the plate member and positioned downstream of the plate member within the water line, said plate member and main body block each having a plurality of water saving holes arranged circumferentially so that the holes can be aligned to permit the flow of water through the device, wherein the number and extent of alignment of said holes in the main body block and plate can be changed by relative rotation of the plate member with the main body block, said holes in the main body block extending through said main body block substantially parallel the water line; and a water deflecting member positioned downstream of said main body block, said deflecting member having an umbrella-shaped surface facing a discharge path of water passing through the holes in the main body block so as to deflect water passing through the holes against an inner wall of the water line.

9. A water saving device in accordance with claim 7, wherein said water deflecting member comprises a bolt used to secure the main body block to said plate, wherein the bolt protrudes from the end of the main body block to form said umbrella-shaped surface.

10. The water saving device in accordance with claim 8, wherein the plate member is made of metal and the main body block is a molded non-metallic product.

11. The water saving device in accordance with claim 10, wherein the main body block is made of ceramics.

12. A water saving device as in claim 9 including disengagable cooperating means on said plate and said main body block for preventing relative rotation therebetween and yet permitting change to a different rotational relationship when disassembled, thus to permit change in the hole alignments.

* * * * *